Figure 1:
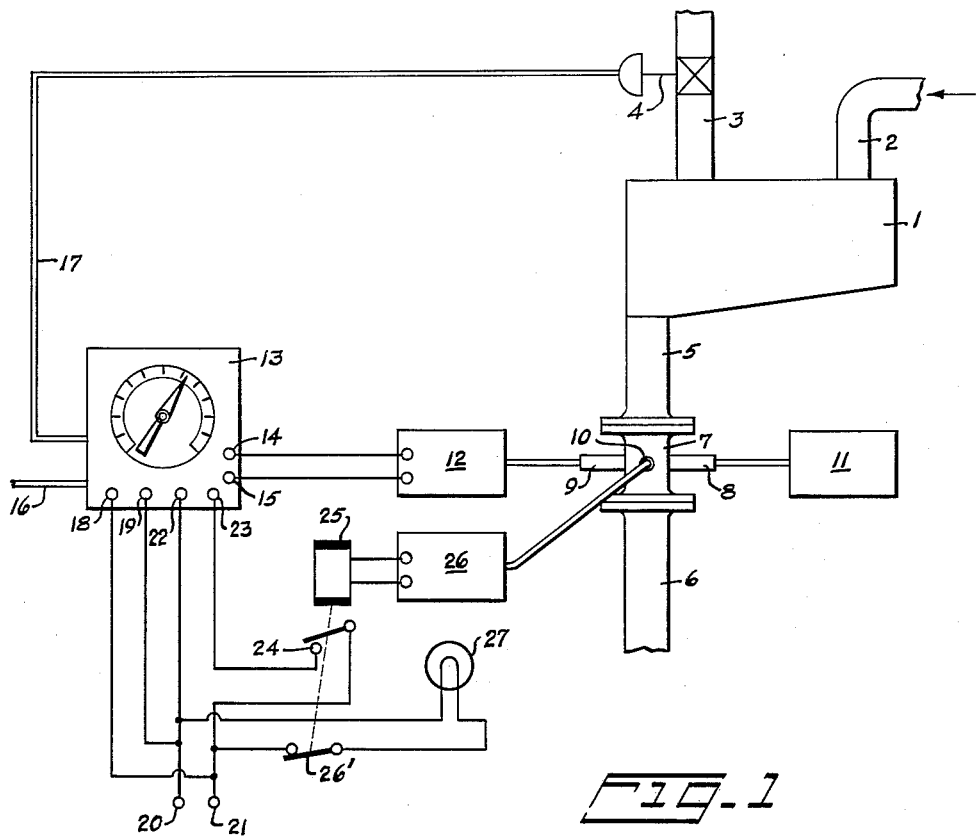

Dec. 27, 1960     R. B. HELLER     2,966,056
ULTRASONIC TESTING DEVICE

Filed Jan. 20, 1956     4 Sheets-Sheet 1

*INVENTOR.*
ROBERT B. HELLER
BY
AGENT

Dec. 27, 1960    R. B. HELLER    2,966,056
ULTRASONIC TESTING DEVICE
Filed Jan. 20, 1956    4 Sheets-Sheet 2

INVENTOR.
ROBERT B. HELLER
BY
AGENT

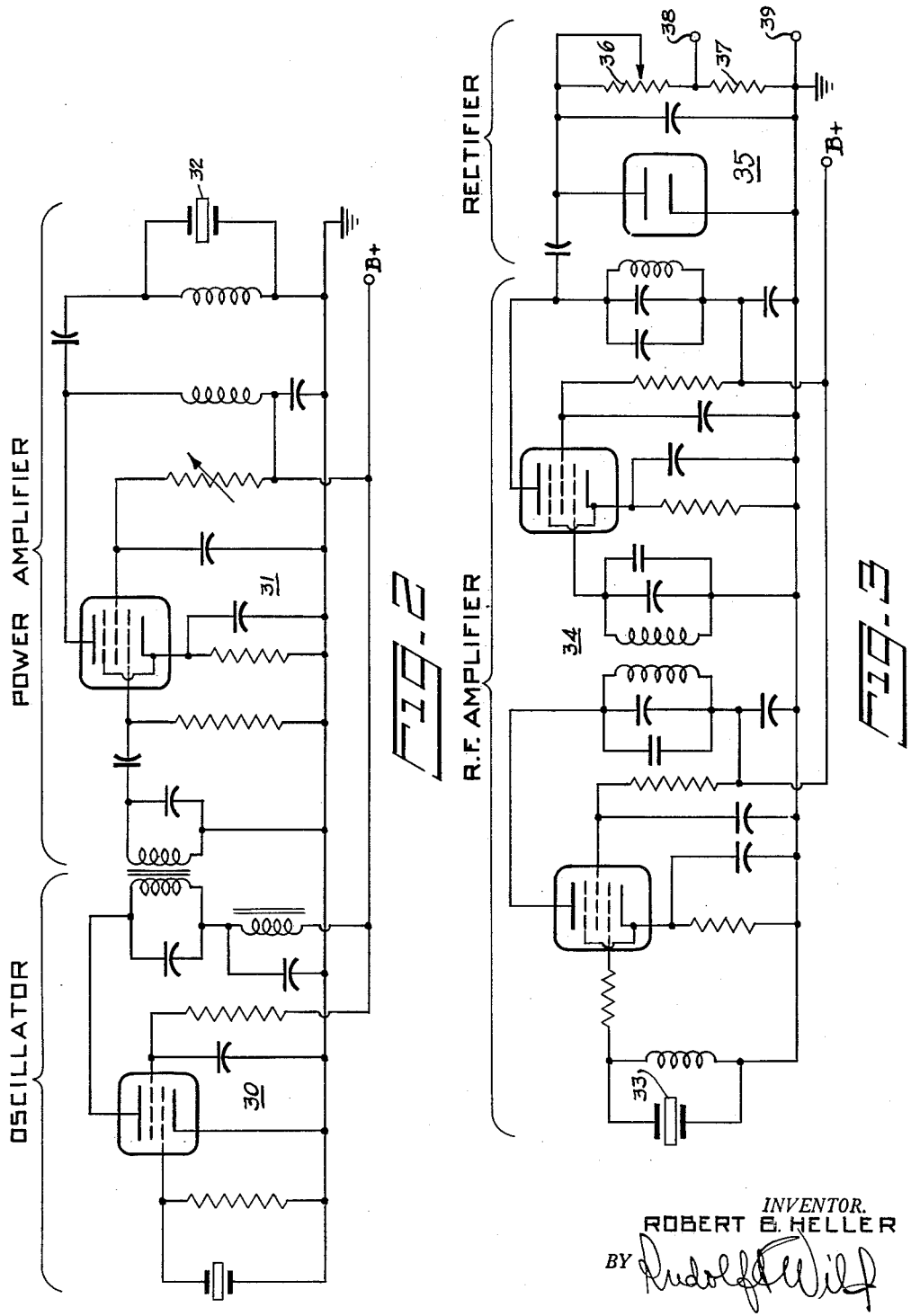

INVENTOR.
ROBERT B. HELLER
BY Rudolf Wild
AGENT

2,966,056

ULTRASONIC TESTING DEVICE

Robert B. Heller, Silver Spring, Md., assignor to Curtiss-Wright Corporation, a corporation of Delaware Filed Jan. 20, 1956, Ser. No. 560,328

4 Claims. (Cl. 73—67.6)

This invention relates to ultrasonic apparatus and particularly to apparatus and an instrument for detecting the presence of bodies or particles of material occluded in material under test. This invention is also useful in measuring the orientation of occluded particles in material.

The attenuation of ultrasonic energy can be used to indicate characteristics of a material or to indicate the concentration of one or more constituents in composite material made up of constituents having different attenuation characteristics. Such instruments can be used, for example, to measure the concentration of paper pulp in an aqueous slurry. In operation of such instruments, difficulties arise when the slurry contains air bubbles which present an extremely high degree of attenuation to ultrasonic energy, and, hence, give rise to spurious indications of pulp concentration.

In materials in which particles are imbedded, such as copper or brass slivers in a plastic material, it is of interest to know the direction of orientation of these particles, which often have an elongated shape.

It is an object, therefore, of this invention to provide apparatus for detecting the presence of bodies and particles of foreign material in composite material, and to provide an instrument for measuring the attenuation of ultrasonic energy through material to give an indication of the composition of such material and further to indicate the presence of extraneous material and to make ineffective the generation of spurious signals caused by such extraneous material.

A further object of this invention is to provide an instrument for measuring the orientation of occluded particles in composite material.

In accordance with the present invention, there is provided apparatus for detecting the presence of particles of one constituent in a mixture of materials, comprising means for imparting ultrasonic vibrations to said mixture and means for intercepting the vibrations transmitted through the mixture, wherein the intercepting means are so located as to intercept substantially only vibrations reflected from the particles.

Further in accordance with the present invention, there is provided an instrument for measuring the attenuation of ultrasonic energy through material under test, comprising means for imparting ultrasonic vibrations to the material, and means for intercepting the transmitted vibrations. Means are also provided to indicate the amplitude of the intercepted vibration and means for preferentially intercepting vibrations reflected only from extraneous particles in the material under test. Means might also be provided for indicating the presence of extraneous material and, in the case of automatic process control actuated by such an instrument, for making the central system nonresponsive to spurious indications produced by such extraneous material.

For a better understanding of the invention, together with other and further objects thereof, reference is had to the following description taken in connection with the accompanying drawing and its scope will be pointed out in the appended claims.

Figure 5:
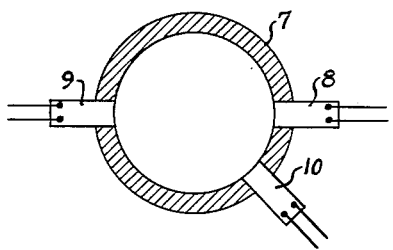
Figure 6:
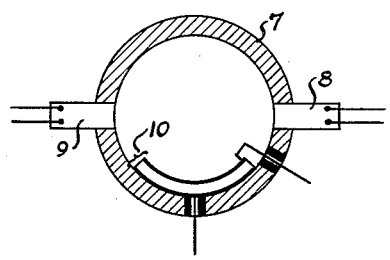
Figure 7:
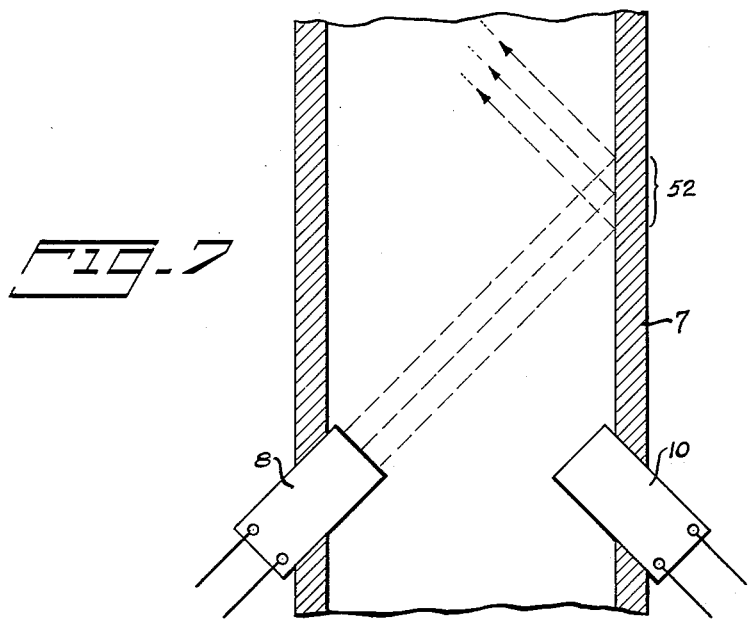
Figure 8:
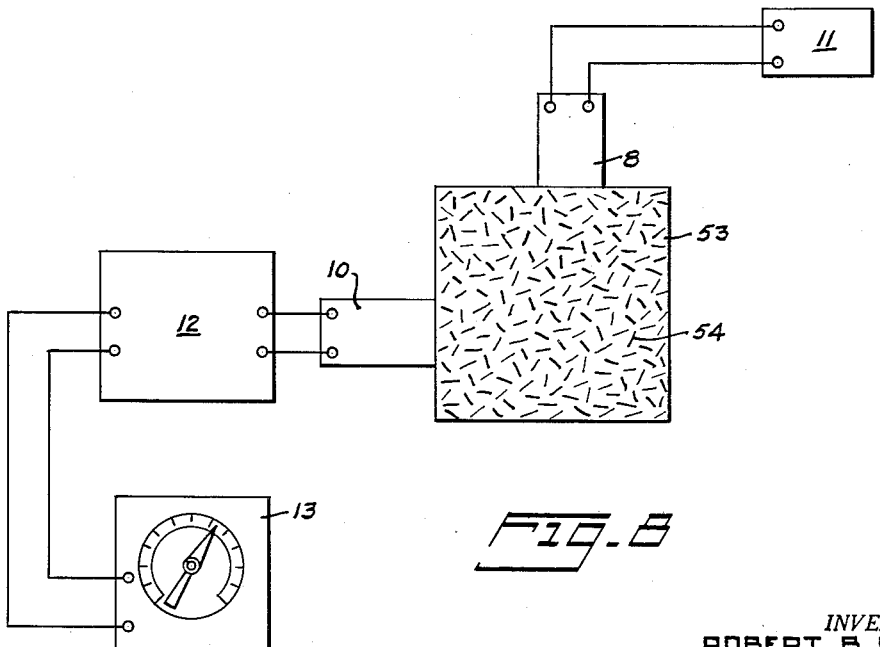
Figure 4:
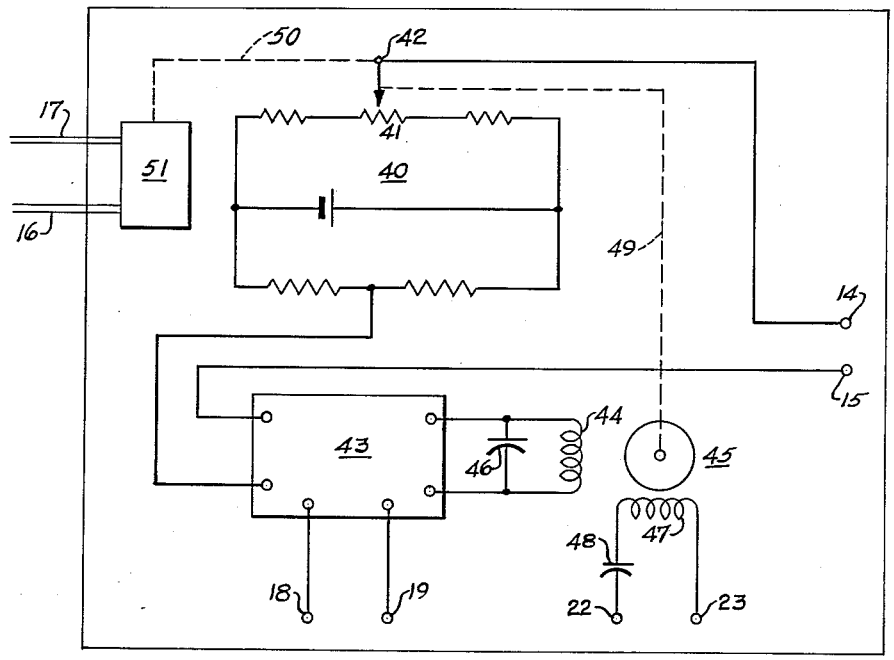

In the accompanying drawings, Fig. 1 schematically illustrates a measuring and automatic control system utilizing the attenuation of ultrasonic energy for measuring and controlling the composition of a process stream, together with means for detecting extraneous bodies or particles in the process stream and utilizing the detected information to indicate the presence of extraneous material and to make the control system nonresponsive to the presence of extraneous material. Fig. 2 and Fig. 3 illustrate, respectively, by way of example, a generator of electric oscillations and ultrasonic vibrations, and signal translating means for converting ultrasonic mechanical vibrations into electric oscillations and a unidirectional signal voltage of a magnitude in accordance with the amplitude of mechanical vibrations. Fig. 4 schematically illustrates most essential components of a recording and controlling instrument shown in Fig. 1, while Figs. 5, 6 and 7 show transducer arrangements in accordance with the present invention. Fig. 8 schematically illustrates an arrangement for measuring orientation or other characteristics of particles in solid material.

Referring now more particularly to Fig. 1, the measuring and control system illustrated, comprises a vessel 1 with a first inlet pipe 2 for admitting water pulp slurry and a second inlet pipe 3 with a control valve 4 for admitting diluting water to the vessel 1. Vessel 1 is also provided with an out-flow pipe 5 coupled to a pipe 6 by means of a pipe section 7 to which electromechanical transducers 8, 9 and 10 are attached, as will be explained later in detail.

For generating electric oscillations of ultrasonic frequency, there is provided an electronic generator 11, coupled to transducer 8 for converting the electric oscillations to mechanical ultrasonic vibrations and for imparting the mechanical vibrations to material (not shown) in pipe section 7. Coupled to transducer 9 are electric signal translating means 12, comprising a radio frequency amplifier and rectifier, for producing a unidirectional electric output signal voltage of a magnitude in accordance with the amplitude of intercepted ultrasonic vibrations. Generator 11 and signal translating means 12 are shown in greater detail in Figs. 2 and 3, respectively.

For indicating the output signal from signal translating means 12, there is provided an indicating and/or recording potentiometer 13 including a pneumatic controller, shown in greater detail in Fig. 4. The output terminals of translating means 12 are coupled to signal input terminals 14 and 15 of potentiometer 13.

Compressed air with a pressure of about 17 p.s.i. is applied to the pneumatic controller section of potentiometer 13 by means of air supply tubing 16, and the output of the pneumatic controller is conected to the control valve 4 by means of a tubing connection 17. An electronic amplifier in the self-balancing potentiometer 13, as shown in Fig. 4, is energized by way of terminals 18 and 19, connected to terminals 20 and 21, which in turn are connected to a 115 v., 60 cycle power line, or any other convenient source of power. One winding of a self-balancing motor in potentiometer 13 is connected to terminals 22 and 23 of potentiometer 13, as will be explained in greater detail in connection with Fig. 4. Terminal 22 is connected to terminal 20, while terminal 23 is connected through contact 24 of a relay 25 to terminal 21.

For the purpose of producing an alarm upon occurrence of extraneous material in the material flowing through pipe section 7, there is provided second electric signal translating means 26 coupled to transducer 10. The translating means 26 can be of the same design as translating means 12, including a radio frequency amplifier and rectifier as illustrated schematically in Fig. 3, whose unidirectional output signal is applied to relay 25. Associated with relay 25 is a contact 26', connected in circuit with an incandescent alarm light 27, connected to the power line terminals 20 and 21, respectively, as shown.

Referring now to Fig. 2, there is shown a preferred embodiment of generator 11, comprising a crystal-controlled oscillator of conventional design, generally designated at 30, for generating sinusoidal electric oscillations of ultrasonic or radio frequency. For the purpose of amplifying these oscillations there is coupled to the oscillator 30, as shown, a power amplifier, generally designated at 31, also of conventional design. Coupled to the amplifier 31 is a transducer 32, which may employ a piezoelectric quartz crystal and corresponds to transducer 8 of Fig. 1. However, my invention is in no way limited to the specific type of transducer used, inasmuch as other piezoelectric material, such as barium titanate, can be used in the transducer, or an electromagnetic transducer might be preferable in some cases.

Fig. 3 shows a preferred embodiment of signal translating means 12 and 26 for converting intercepted ultrasonic vibrations into an electric signal, comprising an electromechanical transducer 33, which might be of the same construction as transducer 32, or any other suitable construction, and a radio frequency amplifier 34 of conventional design for amplifying electrical oscillations generated by transducer 33, corresponding to transducers 9 and 10 of Fig. 1. Coupled to the output of amplifier 34 is a rectifier circuit 35 of conventional design, operating into an electrical load comprising an adjustable rheostat 36 and a fixed resistor 37, the latter with output terminals 38 and 39, across which a unidirectional electric signal is produced in accordance with the amplitude of ultrasonic mechanical vibrations intercepted by the transducer 33. Rheostat 36 is provided for adjustment of the sensitivity of the instrument by variation of the output signal between terminals 38 and 39 by adjustment of rheostat 36.

Fig. 4 schematically illustrates the essential parts in self-balancing potentiometer 13, which comprises the signal input terminals 14 and 15 and a measuring circuit in the form of a Wheatstone bridge, generally indicated at 40, having a slide wire 41 and slider 42. For the purpose of amplifying the error signal, that is, the difference between the unidirectional signal voltage applied between terminals 14 and 15 and the voltage developed across the Wheatstone bridge 40, there is provided an amplifier 43, of conventional design, having a 60 cycle vibrator, a resistance-capacitance coupled amplifier section, and a phase-sensitive power output stage, as is well known to those skilled in the art and conventional in self-balancing potentiometers. The output of amplifier 43 is coupled to a motor winding 44 associated with a self-balancing motor generally indicated at 45, and a capacitor 46, being connected in parallel to motor winding 44. Amplifier 43 is energized with 60 cycle power by way of terminals 18 and 19 on potentiometer 13. Motor 45 is also equipped with a second winding 47 connected in series with a capacitor 48 and connected to terminals 22 and 23 of potentiometer 13, as shown. A mechanical coupling, generally indicated at 49, is provided between motor 45 and slider 42, and a second mechanical coupling 50 is provided between slider 42 and a pneumatic controller indicated at 51, which is of conventional design and need not be described in any greater detail. Thus the voltage output across the bridge 40 caused by the error signal between the terminals 14 and 15 is amplified and utilized to energize the motor 45 which adjusts the slider 42 and balances the bridge 40 and the self-balancing potentiometer 13.

Fig. 5 shows a cross-section through pipe section 7 illustrating the respective positions of transducers 8, 9, and 10 of Fig. 1. Transducers 8 and 9 are diametrically opposed to each other, so that ultrasonic vibrations imparted by transducer 8 and transmitted through material (not shown) flowing through pipe section 7 and attenuated thereby, are readily intercepted by transducer 9. Transducer 10, which may be of the same basic design as transducers 8 and 9, and use, for example, quartz as the piezoelectric elements, is located as shown, so as not to be in the direct path of transmission of vibrations between transducers 8 and 9. It intercepts preferentially only such mechanical ultrasonic vibrations which are reflected from extraneous material in the material between transducers 8 and 9.

Fig. 6 shows an alternate shape of transducer 10, which may be composed of a single piece or a mosaic of piezoelectric elements of, for example, barium titanate.

Fig. 7 shows still another type of soundhead arrangement including a transducer 8 for imparting ultrasonic vibrations to material in pipe section 7 and a transducer 10 located so that it intercepts radiation reflected only from extraneous particles in the path of ultrasonic vibrations imparted by transducer 8. This arrangement does not show a transducer 9, which might be located in the area generally indicated at 52, since this arrangement is intended only to detect extraneous material. If it is desired also to measure the attenuation of material flowing through pipe section 7, a third transducer corresponding to transducer 9 of Fig. 1 can be located in the area 52 of pipe section 7, for intercepting vibrations emanating from transducer 8.

Fig. 8 illustrates apparatus for measuring the presence, distribution or density, size, or orientation, of particles included in solid material. The arrangement includes a generator of electric oscillations 11, connected to a transducer 8, coupled by means of a suitable coupling medium, such as an oil film, to a block of material 53, in which particles 54 of a material having a different acoustic impedance than the remainder of the material, are encountered. Elements 8 and 11 can be of the same design as used in the arrangement of Fig. 1. For the purpose of intercepting ultrasonic vibrations reflected by particles 54, there is provided a second transducer 10, coupled to block 53 by means of a suitable coupling medium, again such as an oil film. Transducer 10 is electrically coupled to electric signal translating means 12, whose output is coupled to a self-balancing potentiometer 13. Elements 10, 12, and 13 may be of the same design as explained in connection with Fig. 1.

The operation of the illustrated embodiments of this invention will now be explained in connection with measurement of the consistency of aqueous paper pulp slurry, whereby it should be clearly understood that this invention is in no way limited to such application.

Referring again to Fig. 1 of the drawings, a concentrated aqueous solution of paper pulp is fed by way of inlet pipe 2 to the vessel 1 and diluting water is fed through the second inlet pipe 3, whereby the flow of water can be controlled by the pneumatically actuated control valve 4. Diluted slurry flows out of vessel 1 through outlet pipe 5, pipe section 7, and pipe 6. Electric oscillations of a suitable frequency above the audible range are generated by generator 11, applied to transducer 8 to be conevrted into mechanical vibrations which are imparted to the slurry (not shown) flowing through pipe section 7. The particular frequency chosen will depend on the type of material under investigation and the frequency chosen is not a limiting feature of this invention. Ultrasonic vibrations, transmitted through the material and attenuated thereby in accordance with hte amount of paper pulp in the aqueous slurry, are intercepted by transducer 9, converted into electric oscillations of corresponding amplitude, which are applied to signal translating means 12. In the radio frequency amplifier section 34 these oscillations are amplified and then rectified in rectifier section 35, as shown in Fig. 3, to produce a unidirectional electric signal across terminals 38 and 39 of a magnitude in accordance with the amplitude of mechanical vibrations intercepted by transducer 9. The output of translating means 12 is applied to the input terminals 14 and 15 of self-balancing potentiometer 13, connected as shown in Fig. 4. The signal appearing between terminals 14 and 15 is applied together with the voltage developed across the Wheatstone bridge 40 to the input terminals of amplifier 43. If the position of slider 42 is not such as to make the voltage across Wheatstone bridge 40 equal and opposite to the signal applied to terminals 14 and 15, amplifier 43 produces a 60 cycle voltage across motor winding 44, whose phase depends upon the relative magnitude of the Wheatstone bridge voltage and the voltage applied to terminals 14 and 15. In cooperation with the voltage applied to winding 47 of motor 45, the rotor of motor 45 rotates in one direction or in opposite direction, depending upon the phase of the voltage developed across motor winding 44, and moves slider 42 in a direction so as to make the voltage across Wheatstone bridge 40 equal and opposite to the voltage applied to terminals 14 and 15, as is well known in the art in the operation of self-balancing potentiometers.

Coupled to slider 42 through a suitable mechanical coupling designated at 50, is the pneumatic controller 51 which produces an output air pressure between, say 3 and 15 p.s.i., which is applied to the pneumatic actuating portion of control valve 4. In this manner, the amount of diluting water added to the concentrated pulp fed to vessel 1 is controlled in accordance with the measured attenuation of ultrasnoic energy transmitted between transducers 8 and 9. In practice, the pneumatic controller 51 is provided with a set-point or control-point adjustment, as is well known in the art, and such details are omitted for the sake of simplicity. The pointer indication given by potentiometer 13 is a measure of the ultrasonic attenuation, and can be calibrated in terms of paper pulp concentration in the slurry flowing through pipe section 7.

In the event the slurry carries air bubbles, caused by gasket leaks and other causes in the process system, a spurious indication of pulp concentration is obtained, since air bubbles in the slurry between transducers 8 and 9 will very substantially increase the attenuation of ultrasonic energy transmitted therebetween. Since the inclusion of air bubbles in the slurry can also materially impair the quality of the paper produced from this slurry, their presence must be detected, indicated, and their effect upon slurry consistency control nullified, as provided by the present invention.

Transducer 10, arranged in pipe section 7 in accordance with one of the showings of drawings 5, 6, or 7, does not intercept ultrasonic vibrations transmitted from transducer 8 to transducer 9. In the presence of air bubbles in the slurry, however, ultrasonic energy transmitted by transducer 8 is reflected and the reflected vibration intercepted by transducer 10, giving rise to electric oscillations in accordance with the amount of energy reflected, which oscillations are applied to signal translating means 26, the output of which controls relay 25 with normally closed contacts 24 and normally open contacts 26' simultaneously. As mentioned above, unit 26 may be of the same design as unit 12, in accordance with the schematic showing of Fig. 3. The sensitivity of unit 26 is so adjusted that ultrasonic energy reflected from the inner wall of tube section 7 that might be intercepted by transducer 10 is insufficient to energize relay 25, which is energized only in the presence of air bubbles in the slurry. Upon energizing relay 25, contact 24 is opened, and contact 26' is closed. When contact 24 opens the connection between motor winding 47 of Fig. 4, and the power line terminals 20 and 21, hence causing potentiometer 13 to stop at whatever instantaneous reading it had immediately prior to the detection of air bubbles. Consequently, no changes in the setting of control valve 4 will be made by the occurrence of air bubbles, thus making the control system nonresponsive to the occurrence of extraneous material in the slurry process stream.

When relay 25 is energized and the contact 26' is closed, the incandescent signal or alarm light 27 is energized to attract an operator's attention to the presence of air bubbles, whereupon measures can be taken to avoid the inclusion of air bubbles in the process stream. Upon removal of air bubbles, ultrasonic vibrations are no longer intercepted by transducer 10, relay 25 becomes de-energized, potentiometer 13 is restored to operating condition, and the signal light 27 is extinguished.

Referring now to Fig. 5, showing pipe section 7 in cross-section and the respective locations of transducers 8, 9, and 10, it can easily be seen that ultrasonic vibrations transmitted by transducer 8 are intercepted by transducer 9 after being attenuated through material passing through pipe section 7. A certain amount of ultrasonic energy will be reflected from the face of transducer 9 and surrounding tube walls, widely scattered through the cross-section of the pipe and substantially attenuated before these vibrations are intercepted by transducer 10. In operation, the sensitivity of the signal translating means 26 coupled to transducer 10 is so adjusted by means of rheostat 36 of Fig. 3 that ultrasonic energy intercepting transducer 10 below a certain threshold limit cannot energize relay 25 of Fig. 1. If now, air bubbles, having an acoustic impedance vastly different from that of water or paper pulp, appear in the transmission path between transducers 8 and 9, a substantial amount of ultrasonic energy will be reflected therefrom and intercepted by transducer 10, thus bringing the intercepted energy above the threshold limit required to energize relay 25.

Fig. 6 shows a modification of the arrangement of Fig. 5, in that a large-area barium titanate transducer is shown as element 10, adapted to intercept reflections from air bubbles appearing in a wider zone of the transmission path between transducers 8 and 9, than might be likely with a quartz-crystal transducer, which generally has a relatively small effective area.

The arrangement of Fig. 7 has the advantage that ultrasonic vibrations reflected from the inner wall of tube section 7 are reflected away from transducer 10, as indicated by the broken lines in Fig. 7, so that the threshold limit to which the bubble detecting system can be set can be made lower than with the arrangements of Figs. 5 and 6 in which some ultrasonic energy is normally intercepted by transducer 10, even in the absence of air bubbles, because of reflections from the inner wall of pipe section 7. Obviously, inclusion of air bubbles in the path of ultrasonic vibrations emanating from transducer 8 reflects ultrasonic energy in various directions, and some of this energy will be intercepted by transducer 10, giving rise to an electric signal indicating the presence of such air bubbles. As mentioned before, a third transducer, corresponding to transducer 9 of Figs. 1, 5, and 6, can be added to the arrangement of Fig. 7, simply by locating it in the area 52 of pipe section 7, and so directing it that it will intercept vibrations emanating from transducer 8.

The arrangement of Fig. 8, in which the same elements are indicated by the same numerals as in Fig. 1, operates similarly to the arrangement of Fig. 1, in that the electric generator 11 applies electric oscillations of suitable frequency to transducer 8, which is coupled by means of a suitable coupling medium, such as an oil film, to a block of material 53, having occluded particles 54. If now, the acoustic impedance of particles 54 differs from that of the remainder of the material, reflection of ultrasonic energy will occur on the interfaces or boundaries between the two materials, giving rise to vibrations directed toward transducer 10, which is located outside of the normal path of vibrations emanating from transducer 8. Vibrations intercepted by transducer 10 are converted into electric oscillations, which are applied to signal translating means 12 and potentiometer 13, of the same type as explained in connection with Fig. 1. Depending upon the orientation of particles 54 in the block of material 53, more or less ultrasonic energy will be reflected in such a direction as to be intercepted by transducer 10, and readings of potentiometer 13 can be calibrated, for example, in terms of particle orientation by experimentation with different blocks with different directions of orientation of particles 54.

Obviously, this arrangement can also be used to detect the absence of particles 54 in a block of material, and assuming random distribution of the orientation, it can also be used to measure the concentration or density of particles in a test piece. Whereas, I have spoken of a block of material 53, this is by way of example only, and it will be obvious to those skilled in the art that the arrangement in accordance with this invention can be applied to many shapes of bodies of material under test.

Whereas the operation of the embodiments of this invention have been explained, in part, in connection with air bubbles, it is understood that air bubbles or any particles of material, be they in gaseous, liquid, or solid state, can be detected with the apparatus disclosed herein, and it is my intent that the term "particle," where used herein, include small bodies of material in any of the three states.

While there has been described what is at present considered to be the preferred embodiment of this invention, it will be obvious to those skilled in the art that various changes and modifications may be made therein without departing from the intervention, and it is, therefore, aimed in the appended claims to cover all such changes and modifications as fall within the true spirit and scope of the invention.

What is claimed is:

1. Apparatus for indicating the concentration of a constituent in a composite material and the presence of extraneous particles in the composite material which comprises means for imparting ultrasonic vibrations to the composite material along a preselected path, first interceptor means for receiving said ultrasonic vibrations transmitted through the composite material and for generating an electric signal in response to the ultrasonic vibrations intercepted, said electrical signal being a function of the concentration of the constituent in the composition of material, means responsive to said electric signal generated by said first interceptor means for indicating the concentration of the constituent in the composite material, a second interceptor means spaced from said preselected path of ultrasonic vibrations for receiving ultrasonic vibrations imparted to the composite material which are reflected by extraneous particles in the composite material and for generating an electric signal in response to the reflected ultrasonic vibrations intercepted and means responsive to the electric signal generated by the second interceptor means for indicating the presence of extraneous particles in the composite material.

2. Apparatus for indicating the concentration of a constituent in a mixture of materials and the presence of extraneous particles therein which comprises means for imparting a beam of ultrasonic vibrations to the mixture of materials along a preselected path, first interceptor means positioned in the preselected path of the beam of ultrasonic vibrations for receiving the ultrasonic vibrations transmitted through the mixture of materials and for generating an electric signal in response to said ultrasonic vibrations received, said electric signal generated being a function of the concentration of the constituent in the material, means responsive to the electric signal generated by the first interceptor means for indicating the concentration of the constituent in the mixture of materials, second interceptor means positioned outside of the preselected path of the ultrasonic vibrations for receiving only ultrasonic vibrations reflected by extraneous particles in the mixture of materials and for generating an electric signal in response to the ultrasonic vibrations so received, and means responsive to said electric signal generated by the second interceptor means for indicating the presence of extraneous particles in the mixture of materials.

3. An apparatus for indicating the attenuation of a beam of ultrasonic vibrations in a stream of a mixture of materials and the presence of extraneous particles in the mixture of materials which comprises a vessel having inlet and outlet openings therefor to permit a stream of a mixture of materials to flow therethrough, a first electromechanical transducer coupled to the vessel for imparting a beam of ultrasonic vibrations in a preselected path to the mixture of materials flowing through the vessel, a second electro-mechanical transducer coupled to the vessel for intercepting the ultrasonic vibrations transmitted through the stream of the mixture of materials and for generating an electric signal in response to the ultrasonic vibrations intercepted, said electric signal being a function of the attenuation of the ultrasonic vibrations transmitted through the stream of the mixture of materials, means responsive to the electric signal for indicating the amount of attenuation of the ultrasonic vibrations transmitted through the stream of the mixture of materials, a third electro-mechanical transducer positioned outside of the preselected path of ultrasonic vibrations for receiving solely ultrasonic vibrations reflected by extraneous particles in the stream of the mixture of materials and for generating an electric signal in response to the ultrasonic vibrations so received, and means responsive to said electric signal generated by the third electromechanical transducer for indicating the presence of extraneous particles in the mixture of materials.

4. In combination, a vessel having inlet and outlet openings to permit the flow of material therethrough; a first transmitting transducer coupled to said vessel for imparting a beam of ultrasonic vibrations to the material along a preselected path; a first receiving transducer arranged along said preselected path for receiving said ultrasonic vibrations after the same have passed through the material flowing through said vessel; at least a second receiving transducer coupled to said vessel and located at a position spaced from said preselected path of said beam of ultrasonic vibrations so as to be responsive solely to ultrasonic vibrations reflected from extraneous "particles" flowing through said vessel; first control means responsive to any output developed by said first receiving transducer for controlling the composition of the material flowing through said vessel; and second electrical control means connected in circuit with said first electrical control means and responsive to the output of said second receiving transducer for automatically overriding the control provided by said first control means whenever the amount of ultrasonic vibrations received by said second receiving transducer reaches a preselected level.

References Cited in the file of this patent

UNITED STATES PATENTS

| 2,280,226 | Firestone | Apr. 21, 1942 |
| 2,505,867 | Meunier | May 2, 1950 |
| 2,527,208 | Berry et al. | Oct. 24, 1950 |
| 2,768,524 | Beard | Oct. 30, 1956 |

FOREIGN PATENTS

| 741,335 | Germany | Nov. 10, 1943 |
| 865,995 | Germany | Feb. 5, 1953 |